United States Patent
Rogante et al.

(10) Patent No.: US 11,734,701 B2
(45) Date of Patent: Aug. 22, 2023

(54) COGNITIVE DYNAMIC GOAL SURVEY

(71) Applicant: International Business Machines Corporation, Armonk, NY (US)

(72) Inventors: Matteo Rogante, Rome (IT); Andrea Tortosa, Rome (IT); Stefania Brigazzi, Rome (IT); Francesco Triti, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 16/567,130

(22) Filed: Sep. 11, 2019

(65) Prior Publication Data

US 2021/0073835 A1 Mar. 11, 2021

(51) Int. Cl.
*G06Q 30/0203* (2023.01)
*G06F 16/332* (2019.01)
*G06N 3/08* (2023.01)
*G06N 3/04* (2023.01)
*G06N 5/01* (2023.01)

(52) U.S. Cl.
CPC ..... *G06Q 30/0203* (2013.01); *G06F 16/3329* (2019.01); *G06N 3/04* (2013.01); *G06N 3/08* (2013.01); *G06N 5/01* (2023.01)

(58) Field of Classification Search
None
See application file for complete search history.

(56) References Cited

U.S. PATENT DOCUMENTS

| | | | |
|---|---|---|---|
| 6,411,936 B1 * | 6/2002 | Sanders | G06Q 10/0639 705/7.29 |
| 7,398,223 B2 | 7/2008 | Kahlert | |
| 8,635,099 B1 | 1/2014 | Floyd | |
| 2002/0143680 A1 * | 10/2002 | Walters | G06Q 40/06 705/36 R |
| 2002/0188777 A1 | 12/2002 | Kraft | |
| 2004/0193479 A1 | 9/2004 | Hamlin | |
| 2004/0210820 A1 * | 10/2004 | Tarr | G06Q 30/0205 715/205 |
| 2009/0265224 A1 * | 10/2009 | Tarr | G06Q 10/10 707/E17.014 |
| 2011/0076663 A1 | 3/2011 | Krallman | |
| 2013/0218639 A1 | 8/2013 | Nakagawa | |

(Continued)

OTHER PUBLICATIONS

Anonymous, "System and Method for Dynamic Survey Generation Based on Social Media Analysis," IP.com, IPCOM000220253D, Jul. 2012, 14 pages.

*Primary Examiner* — Folashade Anderson
(74) *Attorney, Agent, or Firm* — Van Leeuwen & Van Leeuwen; Anthony M. Pallone (57) ABSTRACT

An approach is provided that transmit a first set survey questions to a user with each of the first set questions corresponding to a primary survey goal. Survey answers are then received from the user. A cognitive system is then used to determining an affinity level between the user and the primary survey goal. If the affinity level reaches a threshold, then a second set of questions is transmitted to the user with these questions also corresponding to the primary survey goal. However, if the first affinity level fails to reach the threshold, then the second set of questions are based on a secondary survey goal and these questions are transmitted to the user.

20 Claims, 6 Drawing Sheets

(56) References Cited

U.S. PATENT DOCUMENTS

| | | | | |
|---|---|---|---|---|
| 2014/0324541 A1* | 10/2014 | Malik | ................ | G06Q 30/0203 |
| | | | | 705/7.32 |
| 2017/0063745 A1* | 3/2017 | Banerjee | ............... | H04L 51/046 |
| 2017/0371861 A1* | 12/2017 | Barborak | ................ | G06N 5/027 |
| 2018/0150748 A1* | 5/2018 | Bastide | ................... | H04L 51/02 |
| 2018/0189457 A1 | 7/2018 | Plummer | | |
| 2019/0325464 A1* | 10/2019 | Wood | ................. | G06Q 30/0201 |
| 2020/0043026 A1* | 2/2020 | Cruz-Rivera | ............ | G06N 5/04 |
| 2020/0150752 A1* | 5/2020 | Kuntagod | .............. | G06V 10/98 |

\* cited by examiner

COGNITIVE DYNAMIC GOAL SURVEY

BACKGROUND

Surveys became a standard tool for empirical research in social sciences with the application of probability sampling in the 1930s. Marketing, and official statistics were initial fields in which surveys were used. Today, online (Internet) surveys have become a valued research tool for a variety of research fields, including marketing, social and official statistics research. Online surveys offer capabilities beyond those available for any other type of self-administered questionnaire.

Online surveys offer several advantages over traditional survey methods. First, online surveys are faster, simpler, and cheaper than traditional survey methods. However, lower costs are not so straightforward in practice, as they are strongly interconnected to errors. In addition, online surveys are challenged because response rates are generally lower than with other traditional survey methods. Efforts to achieve higher response rates often incur additional costs. Other advantages of online surveys is that the entire data collection period is significantly shortened, interaction between the respondent and the questionnaire is more dynamic compared to e-mail or paper surveys, online surveys are also viewed as being less intrusive, and they suffer less from social desirability effects. Additionally, question patterns can be implemented in ways that are mostly invisible to the person taking the survey.

Despite these advantages, online surveys are challenged by people taking the survey providing "fake" answers or not answering the survey at all, thus wasting the survey provider's time and resources. Overall, online surveys are challenged by the usefulness of the survey data often being somewhat lower than the data provided by more traditional survey methods.

SUMMARY

An approach is provided that transmit a first set survey questions to a user with each of the first set questions corresponding to a primary survey goal. Survey answers are then received from the user. A cognitive system is then used to determining an affinity level between the user and the primary survey goal. If the affinity level reaches a threshold, then a second set of questions is transmitted to the user with these questions also corresponding to the primary survey goal. However, if the first affinity level fails to reach the threshold, then the second set of questions are based on a secondary survey goal and these questions are transmitted to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-6 describe an approach that addresses one of the largest concerns when conducting online surveys, namely getting value from the survey even if the user is not willing to answer or when the user is providing random or fake answers. The approach uses a cognitive solution to dynamically adapt the survey in order to reach a predefined goal. This goal may change during the survey to match the user's interests in order to obtain useful information from the user. A key concept of the approach is the survey goal. The person or organization conducting the survey defines a primary goal and one or more secondary goals. Based on answers given by the user, based on previous answers provided by other users, and based on identified trends found in sources such as in social media, the cognitive algorithm can change, or adapt, the survey objective from the primary goal to one of the secondary goals that has already been defined in order to still obtain useful information from the user even when the user's survey answers have little affinity with the primary goal established for the survey.

When creating the survey, goals are defined including a primary goal and one or more secondary goals with the secondary goals being used in case the first one cannot be achieved for a given user. These goals are categorized by the cognitive system to find tags or keywords necessary to calculate the affinity with answers given by the user. A predefined set of questions is proposed to the user when conducting the survey, these questions are used by the cognitive system to categorize the user. The cognitive system analyzes the answers using text recognition and social media analysis to extract tags and keywords from answers and will apply cognitive algorithms to calculate the affinity of given answers to the primary goal. If the affinity is more than a given threshold, the system will select additional questions related to the primary goal. However, if the affinity falls below the threshold, the system calculates if how far the affinity score deviates from the threshold. The approach then determines if, based on the user's survey answers, if one of the secondary goals should be selected along with questions pertaining to such secondary goal. The process continues until the system is satisfied with the user's survey answers. This satisfaction is based on the number of the questions left and on the affinity score that is computed. For example, if the affinity is very low and there are still a lot of questions in the survey, the approach may decide to stop the survey since answers of little value are being obtained. However, if answers of value are being obtained, the system can continue to pose additional survey questions and receive additional survey answers from the user until a satisfaction point is reached with regard to at least one of the goals (primary goal or one or more of the secondary goals).

The approach utilizes multiple goals and multiple question decision trees, with each of the question decision trees being associated to one of the goals. In the learning phase the system generates tags and associates the tags to the goals using previously ingested answers, social media trend data, and sentiment analysis. Each goal has a cluster of tags. Questions are also associated to each goal with each question having a decision tree based on tags values. The set of initial questions proposed to the user are the questions associated to the primary goal.

Using text recognition techniques and machine learning, the system generates tags from the user's survey answers and calculates the affinity of the user's survey answers to the current goal tags. If the affinity is close to the primary goal tags or fit into a meaningful distribution of goal tags, the system continues to pose questions from the current goal decision tree, taking different paths based on the tags. However, if the affinity evaluation results in an affinity "too far" away from the current goal model, the system can lead to decision nodes that turn on different decision trees moving in the context of another (secondary) goal tags cluster. The goal tag clusters of a secondary goal can partially overlapping with the goal tag cluster of the primary goal.

When a secondary goal is identified, the system begins exploring the new decision tree associated with the secondary goal by proposing new sets of questions to the user related to the secondary goal, thus allowing the user to contribute to this secondary goal. Likewise, the first secondary goal can branch to a second secondary goal based on the affinity scores with regard to the tags found in the user's survey answers. This approach utilizes multiple decision trees, each one moving in the context of a goal and having at least a decision node which can turn on different goals.

In one embodiment, once the shift to a secondary goal has been performed, the system does not return to the primary goal, even if this is an alternative option. This is something dependent from the subset of tags to which answers are compared to evaluate the affinity, and also from how the subsequent questions are designed. However, considering the main goal is to obtain value from survey, the approach ascribes specific user answers to the most frequent and meaningful tags of at least one of the goals taken into account, and refrains from reverting back and forth through goals having spread contribution to not frequent or meaningful tags. The approach performs in this manner because jumping between goals would likely lead to a widely spread, and not focused, set of survey feedback. However, the initial survey questions and answers will collaterally contribute to the primary goal, regardless of how the survey evolves through secondary goals based on the user's survey answers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
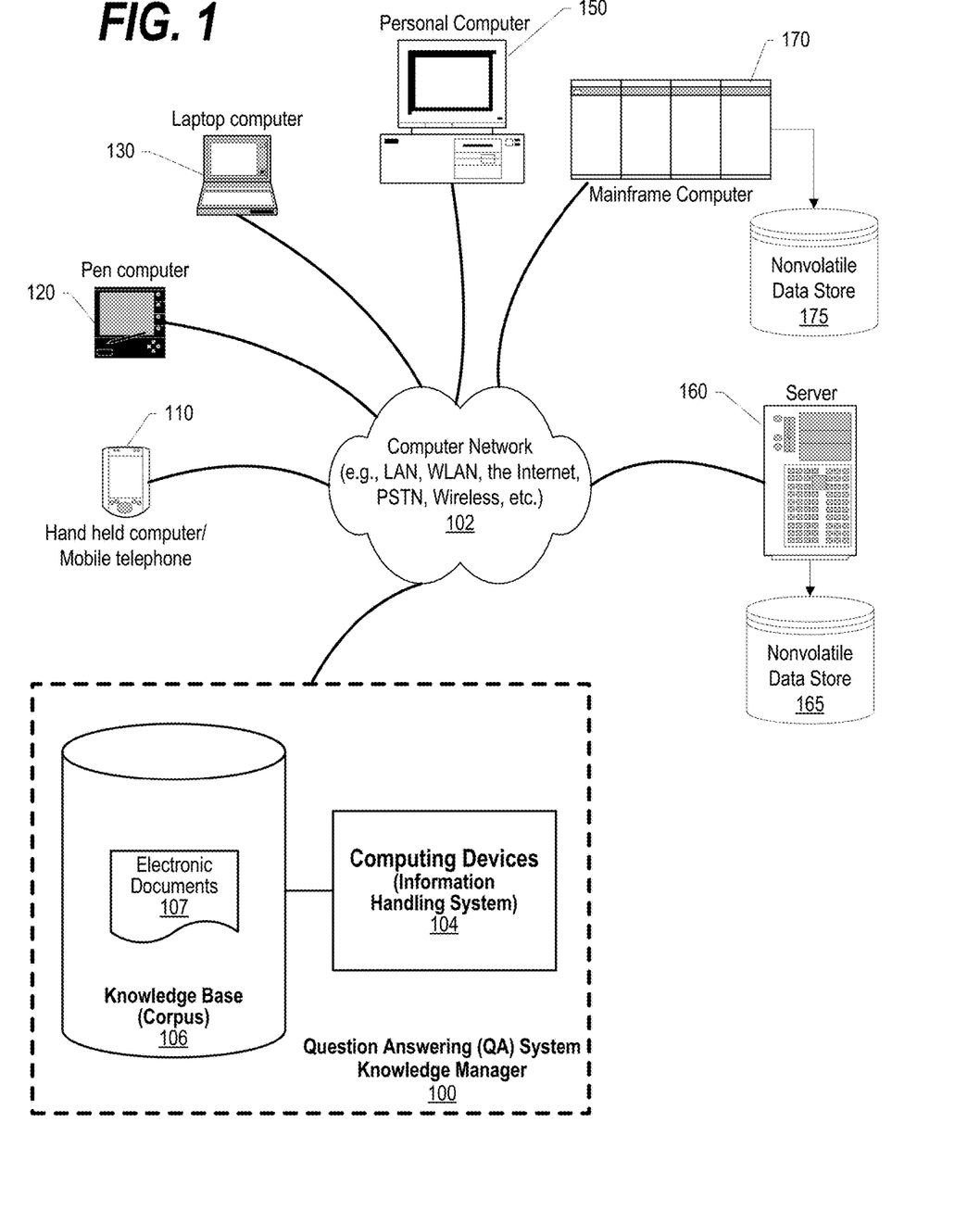
FIG. 1 depicts a network environment that includes a knowledge manager that utilizes a knowledge base.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
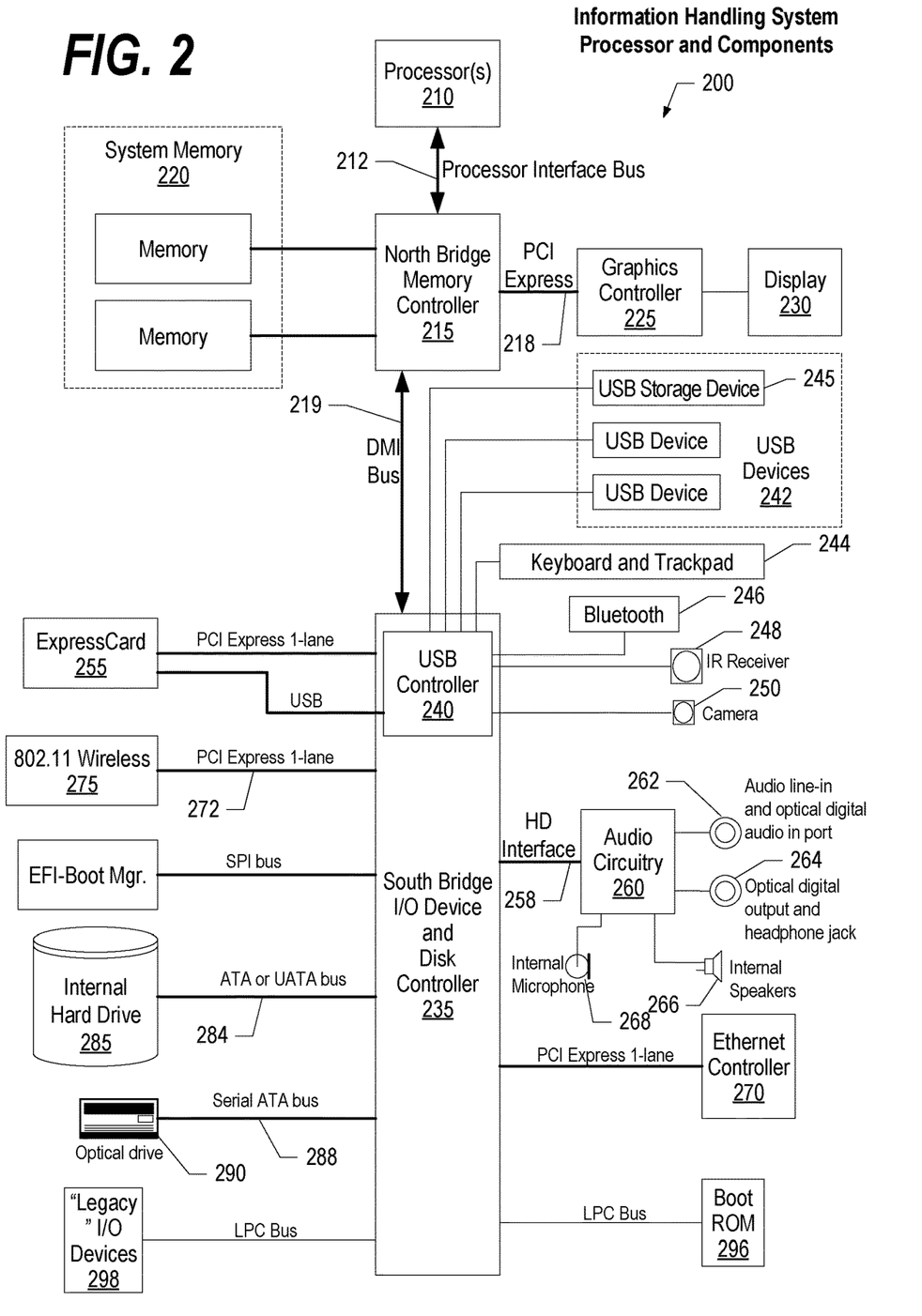
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
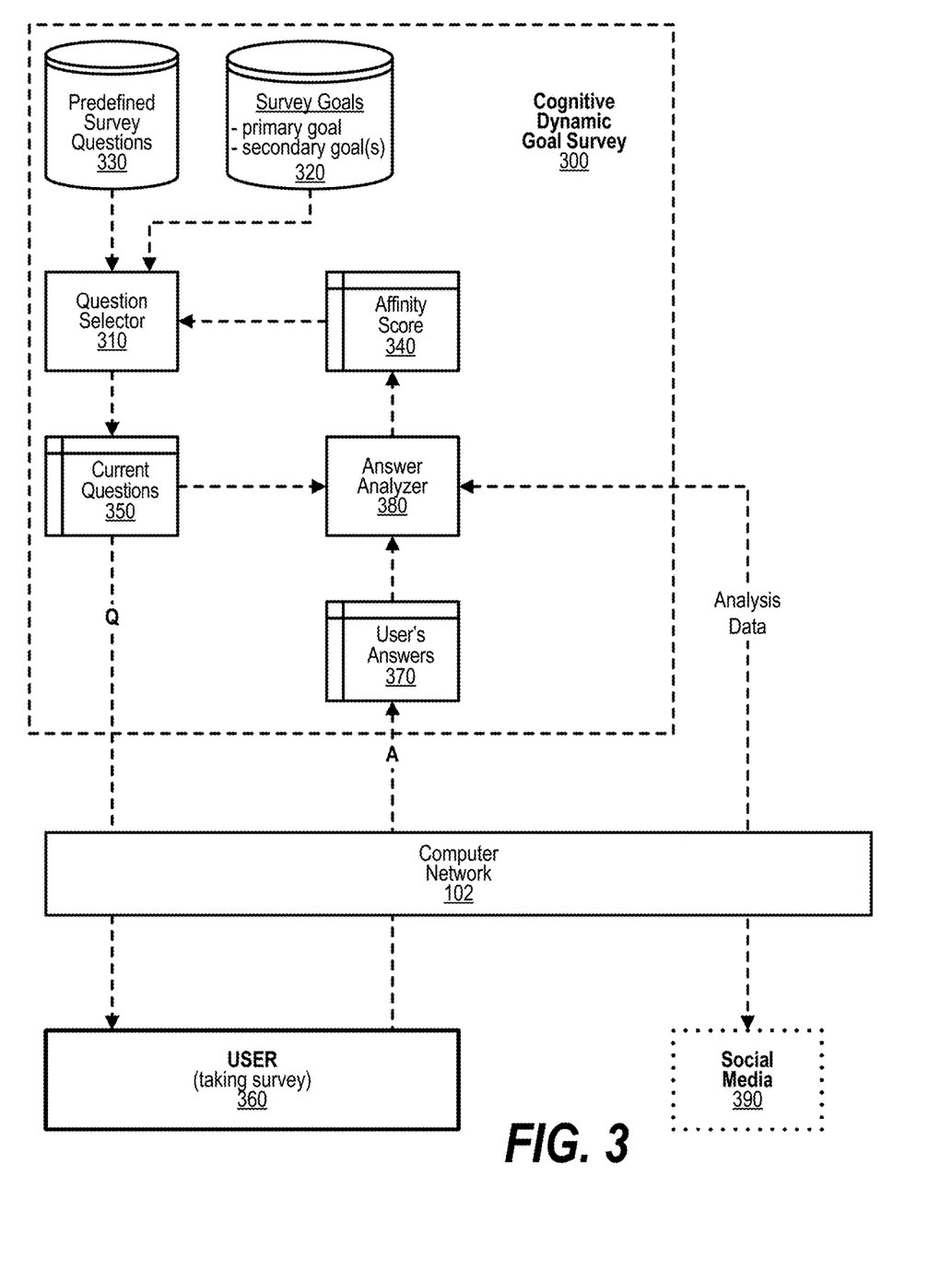
FIG. 3 is a component diagram that shows the various components utilized in providing a system providing a cognitive dynamic goal survey.

FIG. 3 is a component diagram that shows the various components utilized in providing a system providing a cognitive dynamic goal survey. Cognitive dynamic goal survey system 300 identifies survey questions to send to user 360. User 360 provides answers to the survey questions and these questions are analyzed. The initial survey questions are associated with a primary survey goal that the survey system has been tasked to address. Using the components shown being included in system 300, the system determines an affinity level between the user and the primary survey goal based upon the user's answers to the initial survey questions. If the affinity level is sufficient (reaches a given threshold), then more survey questions are posed to the user with these additional survey questions also being associated with the primary survey goal. However, if the affinity level is too low, then an alternate, secondary, survey goal is identified based upon the answers provided by the user. Multiple secondary survey goals can be used in the system with the selected secondary survey goal being based on the particular answers provided by the user. In one embodiment, "tags" are determined based on the answers provided by the user with the tags being used to identify the next question in a multi-level decision tree to select and transmit to the user. The system can be included in a cognitive system or can utilize a trained cognitive system to identify affinity levels and tags.

Turning to the components shown in FIG. 3, the cognitive dynamic goal survey system 300 includes question selector functionality 310 that selects one or more questions from data store 330 based upon the current survey goals. The system commences by transmitting questions corresponding to the primary survey goal. Survey goals for the primary survey goal and one or more secondary survey goals are stored in data store 320. Questions corresponding to each survey goal can be stored in a multi-level decision tree with the question that is selected being based on the tag that is determined from the user's previous answer or answers to previously asked survey questions. Questions currently being asked and transmitted to the user are shown being stored in memory area 350. Answers to those questions, provided by the user, are shown being received and stored in memory area 370.

Answer analyzer functionality 380 takes the user's answers from memory area 370 along with the corresponding questions from memory area 350 and social media trend data from social media sources 390 to determine an affinity level that the user is showing with the current survey goal. The affinity level is stored in memory area 340.

The initial survey goal is the "primary" survey goal. However, if the affinity level found between the user and the primary survey goal slips below a threshold, then one of the secondary survey goals is selected with subsequent questions selected by question selector functionality 310 being associated with the selected secondary survey goal. Question selector functionality compares the affinity level stored in memory area 340 with a threshold to determine whether the next set of questions should be from the currently selected survey goal or if a different survey goal should be selected.

Likewise, further affinity levels can cause the system to switch to yet another secondary survey goal. When an affinity level between the user and the currently selected survey goal is sufficiently high (reaches a threshold), then that same survey goal (either primary or one of the secondary) is used to select and transmit further survey questions to the user. When the system is satisfied with the answers from the user, or if the answers provided are too poor to continue, then the system stops the survey with this user and transmits no further questions to the user.

Figure 4:
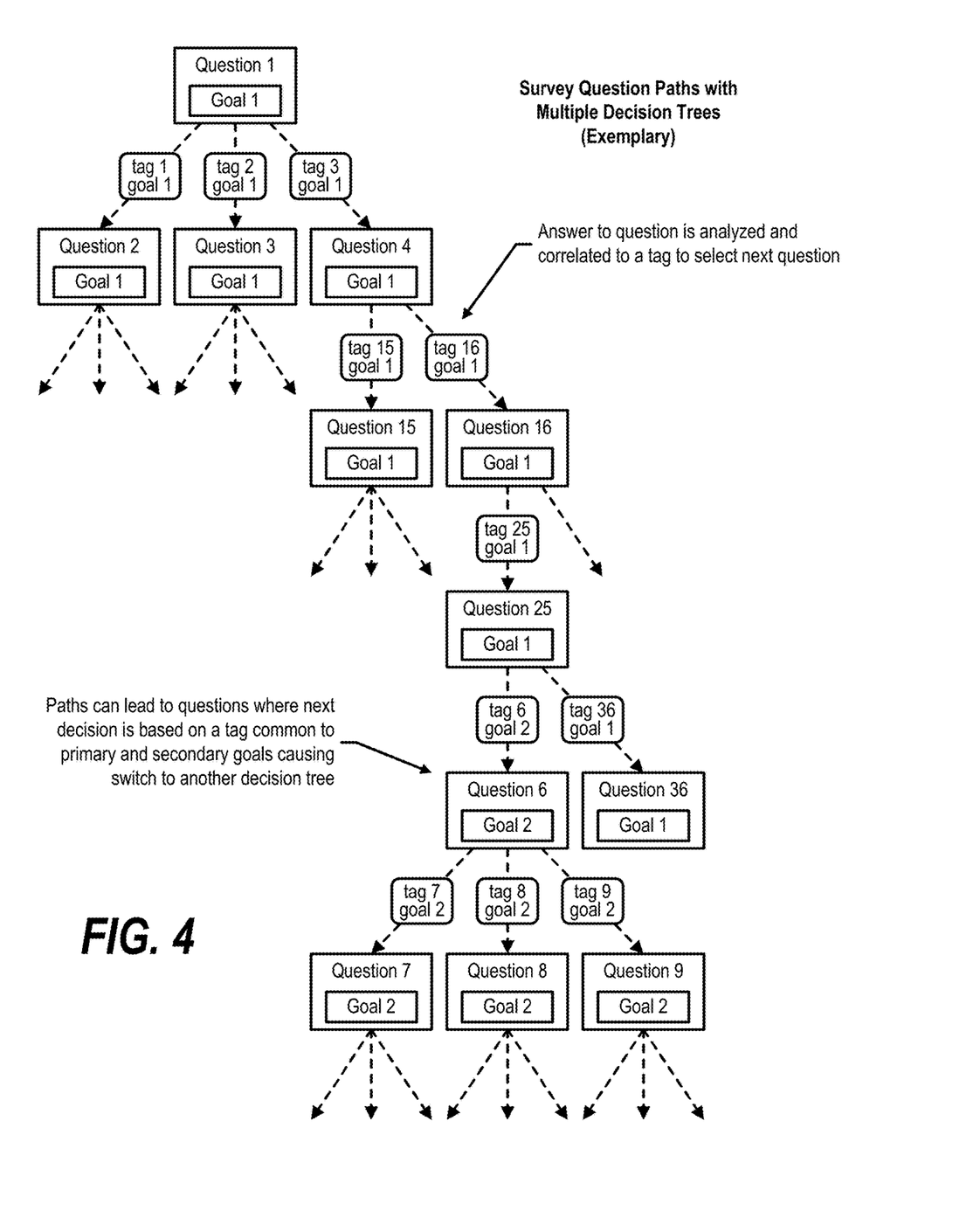
FIG. 4 is a depiction of an example of multiple survey question paths with multiple decision trees and multiple survey goals.

FIG. 4 is a depiction of an example of multiple survey question paths with multiple decision trees and multiple survey goals. Question 1 is the first question being posed to the user with question 1 shown as being associated with goal 1 (the primary survey goal). Based on the answer the user provides to question 1, a tag is determined and this tag is used to select the next question in the decision tree to ask the user. For example, if the initial survey goal (goal 1) regards the user's favorite pet with the user's answer being used to determine a tag used in selecting the next question. Suppose tag 1 is "fish," tag 2 is "cat," and tag 3 is "dog." Depending on which type of pet the user selected from the first survey question would lead to other survey questions related to the pet that the user indicated. However, suppose that the user indicated that he does not like pets, instead the survey goal may switch to a secondary goal, such as the user's preferred modes of transportation, etc. These secondary goals might overlap with the primary goal or might be completely distinct. In the decision tree shown, a match on tag 1 with affinity level keeping the current survey goal (primary survey goal, noted as goal 1) would branch to question 2, likewise having tag 2 branch to question 3, and tag 3 branching to question 4. As shown, the user's answer to the survey question is analyzed and correlated to a tag in order to select the next question.

Moving to the next level of the multi-level decision tree, answers to question 4 are noted as tag 15 with branches to question 15 and tag 16 branching to question 16, both still corresponding to the primary goal (goal 1). While not all branches are shown, one of the branches from question 16 to tag 25 (still corresponding to the primary goal) branching to question 25. However, the answers to question 25 show that one tag (tag 36) keeps the decision tree in the current (primary) goal branching to question 36, while a second tag, tag 6, is associated with a secondary survey goal (goal 2) rather than the primary survey goal and branches to question 6 that is associated with one of the secondary survey goals. Like described above, answers to question 6 branch to other questions depending on the tag (tag 7 branching to question 7, tag 8 branching to question 8, and tag 9 branching to question 9), with all of these tags and questions depicted as also being associated with secondary survey goal (goal 2).

Figure 5:
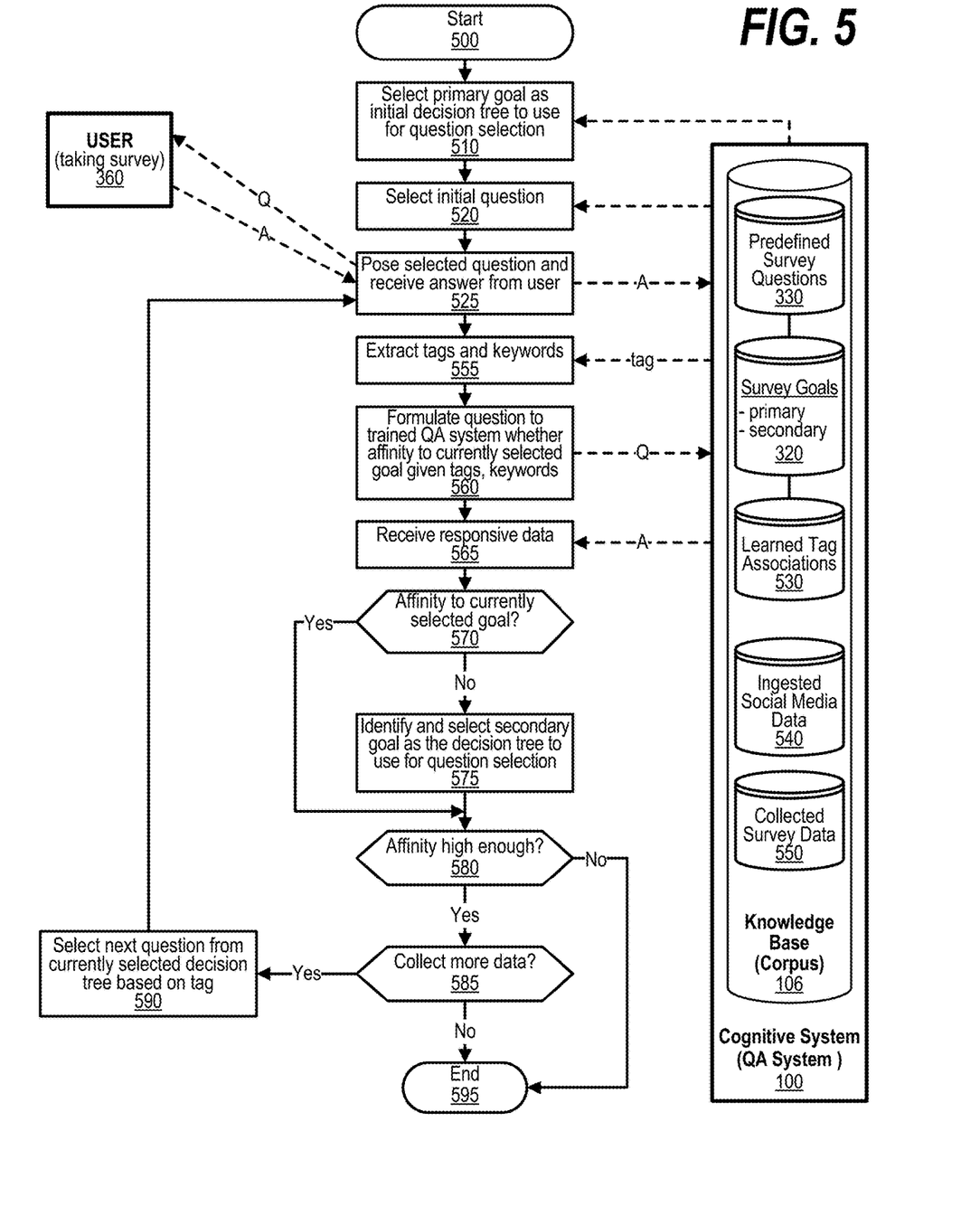
FIG. 5 is a depiction of a flowchart showing the logic used to implement a cognitive dynamic goal survey system.

FIG. 5 is a depiction of a flowchart showing the logic used to implement a cognitive dynamic goal survey system. FIG. 5 depicts the logic that performs the cognitive dynamic goal survey process which is shown commencing at 500. At step 510, the process selects the primary survey goal as the initial survey goal to use for question selection with the questions being selected from the multi-level decision tree associated with the primary survey goal.

Figure 6:
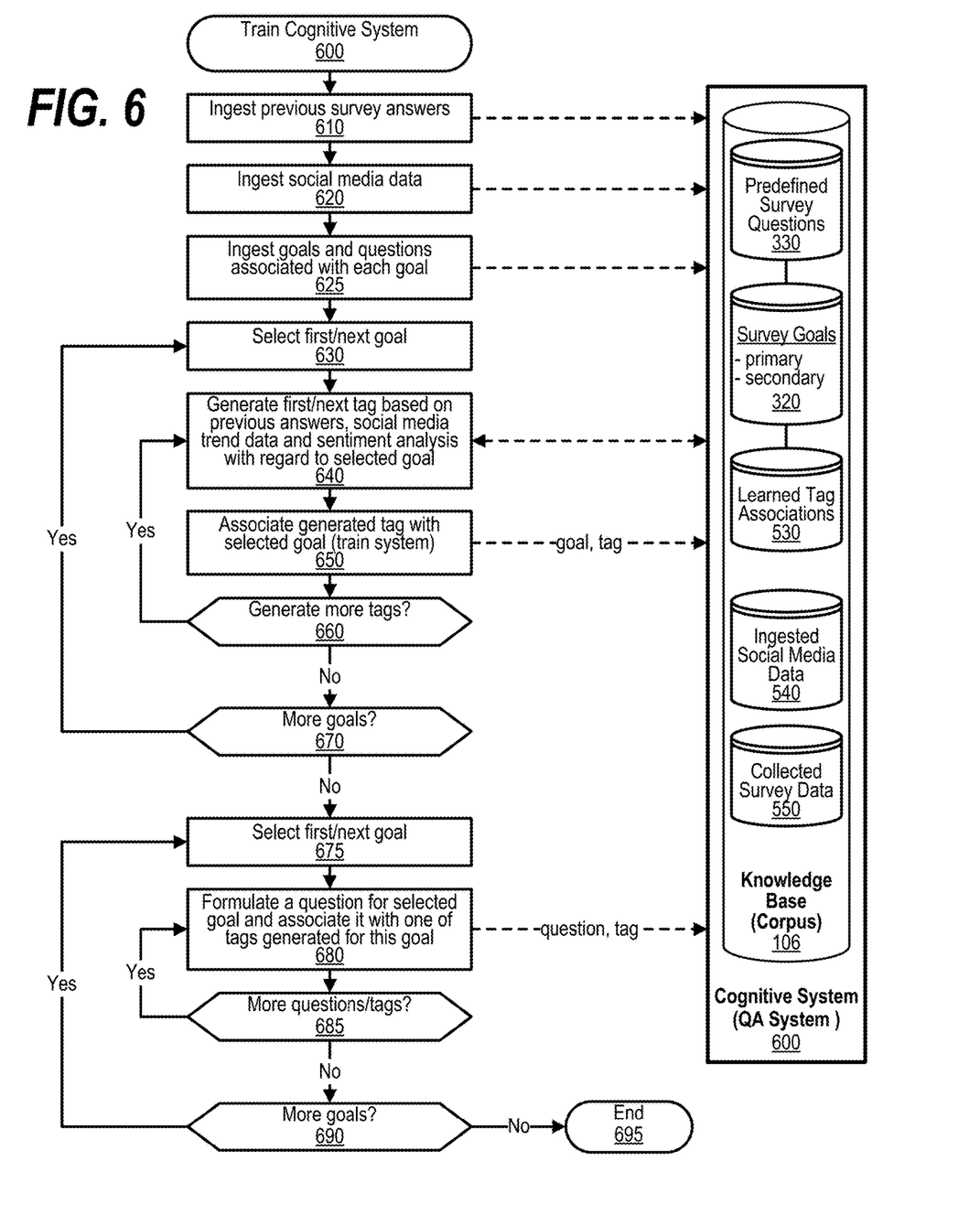
FIG. 6 is a depiction of a flowchart showing the logic used to train a cognitive system that is utilized by the cognitive dynamic goal survey system.

The system utilizes cognitive system 100, such as a question-answering (QA) system, a neural network system, or other type of cognitive system. The cognitive system includes a knowledge base, corpus 106, that includes a wealth of data and information about the cognitive dynamic goal survey being conducted. These data sources include survey goals (data store 320) that includes the primary survey goal as well as one or more secondary survey goals. Data sources also include survey questions 330 that correspond to the various survey goals. The survey goals are arranged in a multi-level decision tree with one question branching to another question based upon the answer given by the user as well as the affinity found between the user and the currently selected survey goal. Data store 530 are learned tag associations that are used to identify "tags" from a user's answer and match to a learned tag that leads to the next question to be posed to the user (see the tags in the decision tree shown in FIG. 4 for further details and examples). The tags are learned using the cognitive system's learning process that is depicted in FIG. 6. In addition, the knowledge base of the cognitive system also includes ingested social media data (data store 540) as well as previously collected survey data (answers) that is shown as being stored in data store 550.

Returning to the process flow, at step 520, the process selects an initial question from the cognitive system with the question being retrieved from the set of survey questions stored in data store 330. At step 525, the process poses the selected question to user 360 and receives a responsive answer from the user. The answer is fed to the cognitive system with the cognitive system extracting tags and keywords from the user's answer based on the training that was previously performed on the cognitive system (see FIG. 6) so that the cognitive system understands tags of interest. At step 555, the process receives the extracted tags and keywords from the cognitive system.

At step 560, the process requests an affinity level between the user and the currently selected survey goal. When a QA type cognitive system is used, the process formulates a question to the trained QA system as to the affinity level of the user to the currently selected survey goal given the user's answer to the survey questions and based upon any extracted tags. At step 565, the process receives responsive data from cognitive system 100 in the form of an answer (determined affinity level) which might also include a confidence level regarding the system's confidence that the determined affinity level is accurate.

The process determines as to whether the affinity level of the user to the currently selected goal is sufficiently high by comparing the affinity level to a threshold (decision 570). The decision might also take into account the confidence level that was returned by the cognitive system. If the affinity level of the user to the currently selected goal is sufficiently high, then decision 570 branches to the 'yes' branch bypassing step 575. On the other hand, if the affinity level of the user to the currently selected goal does not reach the threshold, then decision 570 branches to the 'no' branch whereupon, at step 575 the process identifies and selects a secondary goal from data store 320 as the currently selected survey goal and uses its corresponding decision tree for further question selection of additional questions to pose to the user.

The process determines as to whether the determined affinity level is high enough to continue the survey (decision 580). If the affinity level is so low that it indicates that the user is not providing answers of any value to the survey, then decision 580 is used to terminate the survey. If the affinity level is high enough to continue, then decision 580 branches to the 'yes' branch for further processing. On the other hand, if the affinity level is too low to continue the survey, then decision 580 branches to the 'no' branch whereupon processing ends at 595.

If the affinity level is sufficiently high to continue the survey, then the process next determines whether additional data collection is needed or if the survey system is satisfied with the set of survey answers provided by this user (decision 585). If additional data collection is deemed necessary, then decision 585 branches to the 'yes' branch whereupon, at step 590, the process selects the next question from currently selected decision tree based on the extracted tag (see FIG. 4 for examples of branching to questions based on tags). On the other hand, if additional data collection is not needed, then decision 585 branches to the 'no' branch whereupon processing ends at 595.

FIG. 6 is a depiction of a flowchart showing the logic used to train a cognitive system that is utilized by the cognitive dynamic goal survey system. FIG. 6 processing commences at 600 and shows the steps taken by a process that trains the cognitive system regarding tags that are associated with survey goals and predefined questions. At step 610, the process ingests previous survey answers and stores the ingested data in data store 550 within knowledge base 106 of cognitive system 100. At step 620, the process ingests social media data and stores the ingested data in data store 540 within knowledge base 106 of cognitive system 100. At step 625, the process ingests survey goals and predefined survey questions associated with each survey goal and stores the ingested data in data stores 320 and 330, respectively, within knowledge base 106 of cognitive system 100.

At step 630, the process selects the first (primary) survey goal in order to generate tags for the selected survey goal. At step 640, the process generates the first tag based on the previous survey answers, the ingested social media trend data, and sentiment analysis with regard to the selected survey goal. At step 650, the process associates the generated tag with the selected survey goal in order to "train" the cognitive system regarding tags associated with the various survey goals. The process determines whether to generate more tags for the selected survey goal (decision 660). If more tags are to be generated, then decision 660 branches to the 'yes' branch which loops back to step 640 to generate and associate the next tag with the selected survey goal. This looping continues until sufficient tags have been generated, at which point decision 660 branches to the 'no' branch exiting the loop.

The process determines whether there are more secondary survey goals for which tags should be generated (decision 670). If there are more secondary survey goals for which tags should be generated, then decision 670 branches to the 'yes' branch which loops back to step 630 to select and process the next survey goal as described above. This looping continues until all of the secondary survey goals have been processed, at which point decision 670 branches to the 'no' branch exiting the loop.

Steps 675 through 695 are performed to formulate survey questions corresponding to the various survey goals and generated tags. These steps build the multi-level decision tree of questions and tags such as the decision tree depicted in FIG. 4. At step 675, the process selects the first (primary) survey goal from data store 320. At step 680, the process formulates a survey question for the selected survey goal and associates the formulated question with one of tags that was generated for this survey goal. The formulation of the question might include input from a human survey developer.

The process determines as to whether to generate more questions to associate with tags for the selected survey goal (decision 685). If more questions to associate with tags for the selected survey goal are desired, then decision 685 branches to the 'yes' branch which loops back to step 680 to formulate the next survey question for the selected survey goal and associate the question with one of the generated tags. This looping continues until sufficient question have been formulated for the selected survey goal, at which point decision 685 branches to the 'no' branch exiting the loop.

The process next determines whether there are more (secondary) survey goals for which survey questions are needed (decision 690). If there are more secondary survey goals to process, then decision 690 branches to the 'yes' branch which loops back to step 675 to select the next survey goal from data store 320 and formulate survey questions associated with tags as described above. This looping continues until all of the secondary survey goals have been processed, at which point decision 690 branches to the 'no' branch exiting the loop. FIG. 6 processing thereafter ends at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    training a cognitive system using a plurality of survey questions and previously supplied answers to the plurality of survey questions;
    training the cognitive system using a set of survey goals and one or more of the survey questions associated with each of the survey goals, wherein the survey goals includes a primary survey goal and a secondary survey goal;
    identifying a plurality of trends from one or more social media, the trends corresponding to the survey goals;
    generating a plurality of tags corresponding to the survey goals, wherein each of the tags is based on the previously supplied answers and the plurality of trends;
    training the cognitive system by associating the generated plurality of tags with the corresponding survey goals;
    transmitting an initial set of one or more survey questions selected from the plurality of survey questions to a user, wherein each of the initial set of survey questions corresponds to the primary survey goal;
    responsively receiving, from the user, an initial set of one or more survey answers, wherein each of the survey answers corresponds to one of the initial set of survey questions;
    determining by the cognitive system, an initial affinity level between the user and the primary survey goal based upon the association of the generated tags to the primary survey goal;
    updating the plurality of tags based on the initial set of survey answers;
    in response to the initial affinity level reaching a threshold, transmitting a primary set of additional survey questions to the user, wherein each of the primary set of survey questions corresponds to the primary survey goal;
    in response to the initial affinity level failing to reach the threshold, transmitting a secondary set of additional survey questions to the user, wherein each of the secondary set of survey questions corresponds to the secondary survey goal;
    executing by the cognitive system, a feedback loop comprising:
        further training the cognitive system by associating the updated plurality of tags with the corresponding survey goals, the further training resulting in an affinity level between the user and the primary survey goal that is different from the initial affinity level; and
        further training the cognitive system by updating one or more of the plurality of tags corresponding to the primary survey goal based on subsequent answers and subsequent social media trend data;
    transmitting subsequent set of one or more survey questions selected from the plurality of survey questions to a user, wherein each of the initial set of survey questions corresponds to the primary survey goal and wherein the subsequent set of survey questions is different from the initial set of survey questions due to the feedback loop executed by the cognitive system; and
    responsively receiving, from the user, a secondary set of one or more survey answers, wherein each of the secondary set of survey answers corresponds to one of the secondary set of survey questions.

2. The method of claim 1 wherein the primary goal corresponds to a primary decision tree, wherein each of the initial and primary sets of survey questions being included in the primary decision tree, and wherein the secondary goal corresponds to a secondary decision tree, wherein the secondary set of additional survey questions are included in the secondary decision tree.

3. The method of claim 2 further comprising:
    ingesting a set of training data into the cognitive system, the set of training data comprising a training set of survey questions and a corresponding training set of survey answers, a set of social media data, the primary survey goal;
    generating a plurality of tags based on the ingested set of training data and based on a sentiment analysis between the ingested data and the first and second survey goals;
    training the cognitive system by associating each of the generated tags with at least one of the survey goals;
    formulating the primary and secondary sets of survey questions and associating each of the primary and secondary sets of survey questions with one of the generated tags that is associated with the primary survey goal; and
    formulating the secondary additional set of survey questions and associating each of the secondary additional set of survey questions with one of the generated tags that is associated with the secondary goal.

4. The method of claim 3 further comprising:
    receiving a first of the initial set of survey answers from the user;
    determining a first tag from the received first answer;

identifying, based on the determined first tag, a second question; and transmitting the second question to the user.

5. The method of claim 4 further comprising:

in response to the first affinity level reaching the threshold, the identifying of the second question further comprises selecting the second question from the primary decision tree that corresponds to the primary survey goal; and in response to the first affinity level failing to reach the threshold, the identifying of the second question further comprises selecting the second question from the secondary decision tree that corresponds to the secondary survey goal.

6. The method of claim 5 further comprising:

receiving, from the user, a second answer corresponding to the second question with the second question being selected from the second decision tree;

determining a second tag from the received second answer;

utilizing the cognitive system, determining a second affinity level between the user and the secondary survey goal based on the second tag;

in response to the second affinity level reaching the threshold:

identifying, based on the determined second tag, a third question that is selected from the second decision tree; and transmitting the third question to the user; and in response to the second affinity level failing to reach the threshold:

identifying, based on the determined second tag, a third question that is selected from a third decision tree that corresponds to a tertiary survey goal; and transmitting the third question to the user.

7. The method of claim 1 wherein the cognitive system is a type of system selected from the group consisting of a question-answering (QA) system, a artificial intelligence (AI) system, and a neural network system.

8. An information handling system comprising:

one or more processors;

a memory coupled to at least one of the processors; and a set of computer program instructions stored in the memory and executed by at least one of the processors in order to perform actions comprising:

training a cognitive system using a plurality of survey questions and previously supplied answers to the plurality of survey questions;

training the cognitive system using a set of survey goals and one or more of the survey questions associated with each of the survey goals, wherein the survey goals includes a primary survey goal and a secondary survey goal;

identifying a plurality of trends from one or more social media, the trends corresponding to the survey goals;

generating a plurality of tags corresponding to the survey goals, wherein each of the tags is based on the previously supplied answers and the plurality of trends;

training the cognitive system by associating the generated plurality of tags with the corresponding survey goals;

transmitting an initial set of one or more survey questions selected from the plurality of survey questions to a user, wherein each of the initial set of survey questions corresponds to the primary survey goal;

responsively receiving, from the user, an initial set of one or more survey answers, wherein each of the survey answers corresponds to one of the initial set of survey questions;

determining by the cognitive system, an initial affinity level between the user and the primary survey goal based upon the association of the generated tags to the primary survey goal;

updating the plurality of tags based on the initial set of survey answers;

in response to the initial affinity level reaching a threshold, transmitting a primary set of additional survey questions to the user, wherein each of the primary set of survey questions corresponds to the primary survey goal;

in response to the initial affinity level failing to reach the threshold, transmitting a secondary set of additional survey questions to the user, wherein each of the secondary set of survey questions corresponds to the secondary survey goal;

executing by the cognitive system, a feedback loop comprising:

further training the cognitive system by associating the updated plurality of tags with the corresponding survey goals, the further training resulting in an affinity level between the user and the primary survey goal that is different from the initial affinity level; and further training the cognitive system by updating one or more of the plurality of tags corresponding to the primary survey goal based on subsequent answers and subsequent social media trend data;

transmitting subsequent set of one or more survey questions selected from the plurality of survey questions to a user, wherein each of the initial set of survey questions corresponds to the primary survey goal and wherein the subsequent set of survey questions is different from the initial set of survey questions due to the feedback loop executed by the cognitive system; and responsively receiving, from the user, a secondary set of one or more survey answers, wherein each of the secondary set of survey answers corresponds to one of the secondary set of survey questions.

9. The information handling system of claim 8 wherein the primary goal corresponds to a primary decision tree, wherein each of the initial and primary sets of survey questions being included in the primary decision tree, and wherein the secondary goal corresponds to a secondary decision tree, wherein the secondary set of additional survey questions are included in the secondary decision tree.

10. The information handling system of claim 9 wherein the actions further comprise:

ingesting a set of training data into the cognitive system, the set of training data comprising a training set of survey questions and a corresponding training set of survey answers, a set of social media data, the primary survey goal;

generating a plurality of tags based on the ingested set of training data and based on a sentiment analysis between the ingested data and the first and second survey goals;

training the cognitive system by associating each of the generated tags with at least one of the survey goals;

formulating the primary and secondary sets of survey questions and associating each of the primary and secondary sets of survey questions with one of the generated tags that is associated with the primary survey goal; and formulating the secondary additional set of survey questions and associating each of the secondary additional set of survey questions with one of the generated tags that is associated with the secondary goal.

11. The information handling system of claim 10 wherein the actions further comprise:

receiving a first of the initial set of survey answers from the user;

determining a first tag from the received first answer;

identifying, based on the determined first tag, a second question; and transmitting the second question to the user.

12. The information handling system of claim 11 wherein the actions further comprise:

in response to the first affinity level reaching the threshold, the identifying of the second question further comprises selecting the second question from the primary decision tree that corresponds to the primary survey goal; and in response to the first affinity level failing to reach the threshold, the identifying of the second question further comprises selecting the second question from the secondary decision tree that corresponds to the secondary survey goal.

13. The information handling system of claim 12 wherein the actions further comprise:

receiving, from the user, a second answer corresponding to the second question with the second question being selected from the second decision tree;

determining a second tag from the received second answer;

utilizing the cognitive system, determining a second affinity level between the user and the secondary survey goal based on the second tag;

in response to the second affinity level reaching the threshold:

identifying, based on the determined second tag, a third question that is selected from the second decision tree; and transmitting the third question to the user; and in response to the second affinity level failing to reach the threshold:

identifying, based on the determined second tag, a third question that is selected from a third decision tree that corresponds to a tertiary survey goal; and transmitting the third question to the user.

14. The information handling system of claim 8 wherein the cognitive system is a type of system selected from the group consisting of a question-answering (QA) system, a artificial intelligence (AI) system, and a neural network system.

15. A computer program product stored in a computer readable storage medium, comprising computer program code that, when executed by an information handling system, performs actions comprising:

training a cognitive system using a plurality of survey questions and previously supplied answers to the plurality of survey questions;

training the cognitive system using a set of survey goals and one or more of the survey questions associated with each of the survey goals, wherein the survey goals includes a primary survey goal and a secondary survey goal;

identifying a plurality of trends from one or more social media, the trends corresponding to the survey goals;

generating a plurality of tags corresponding to the survey goals, wherein each of the tags is based on the previously supplied answers and the plurality of trends;

training the cognitive system by associating the generated plurality of tags with the corresponding survey goals;

transmitting an initial set of one or more survey questions selected from the plurality of survey questions to a user, wherein each of the initial set of survey questions corresponds to the primary survey goal;

responsively receiving, from the user, an initial set of one or more survey answers, wherein each of the survey answers corresponds to one of the initial set of survey questions;

determining by the cognitive system, an initial affinity level between the user and the primary survey goal based upon the association of the generated tags to the primary survey goal;

updating the plurality of tags based on the initial set of survey answers;

in response to the initial affinity level reaching a threshold, transmitting a primary set of additional survey questions to the user, wherein each of the primary set of survey questions corresponds to the primary survey goal;

in response to the initial affinity level failing to reach the threshold, transmitting a secondary set of additional survey questions to the user, wherein each of the secondary set of survey questions corresponds to the secondary survey goal;

executing by the cognitive system, a feedback loop comprising:

further training the cognitive system by associating the updated plurality of tags with the corresponding survey goals, the further training resulting in an affinity level between the user and the primary survey goal that is different from the initial affinity level; and further training the cognitive system by updating one or more of the plurality of tags corresponding to the primary survey goal based on subsequent answers and subsequent social media trend data;

transmitting subsequent set of one or more survey questions selected from the plurality of survey questions to a user, wherein each of the initial set of survey questions corresponds to the primary survey goal and wherein the subsequent set of survey questions is different from the initial set of survey questions due to the feedback loop executed by the cognitive system; and responsively receiving, from the user, a secondary set of one or more survey answers, wherein each of the secondary set of survey answers corresponds to one of the secondary set of survey questions.

16. The computer program product of claim 15 wherein the primary goal corresponds to a primary decision tree, wherein each of the initial and primary sets of survey questions being included in the primary decision tree, and wherein the secondary goal corresponds to a secondary decision tree, wherein the secondary set of additional survey questions are included in the secondary decision tree.

17. The computer program product of claim 16 wherein the actions further comprise:

ingesting a set of training data into the cognitive system, the set of training data comprising a training set of survey questions and a corresponding training set of survey answers, a set of social media data, the primary survey goal;

generating a plurality of tags based on the ingested set of training data and based on a sentiment analysis between the ingested data and the first and second survey goals;

training the cognitive system by associating each of the generated tags with at least one of the survey goals;

formulating the primary and secondary sets of survey questions and associating each of the primary and secondary sets of survey questions with one of the generated tags that is associated with the primary survey goal; and formulating the secondary additional set of survey questions and associating each of the secondary additional set of survey questions with one of the generated tags that is associated with the secondary goal.

18. The computer program product of claim 17 wherein the actions further comprise:

receiving a first of the initial set of survey answers from the user;

determining a first tag from the received first answer;

identifying, based on the determined first tag, a second question; and transmitting the second question to the user.

19. The computer program product of claim 18 wherein the actions further comprise:

in response to the first affinity level reaching the threshold, the identifying of the second question further comprises selecting the second question from the primary decision tree that corresponds to the primary survey goal; and in response to the first affinity level failing to reach the threshold, the identifying of the second question further comprises selecting the second question from the secondary decision tree that corresponds to the secondary survey goal.

20. The computer program product of claim 19 wherein the actions further comprise:

receiving, from the user, a second answer corresponding to the second question with the second question being selected from the second decision tree;

determining a second tag from the received second answer;

utilizing the cognitive system, determining a second affinity level between the user and the secondary survey goal based on the second tag;

in response to the second affinity level reaching the threshold:

identifying, based on the determined second tag, a third question that is selected from the second decision tree; and transmitting the third question to the user; and in response to the second affinity level failing to reach the threshold:

identifying, based on the determined second tag, a third question that is selected from a third decision tree that corresponds to a tertiary survey goal; and transmitting the third question to the user.

\* \* \* \* \*